United States Patent
Cromp et al.

(10) Patent No.: US 11,676,391 B2
(45) Date of Patent: Jun. 13, 2023

(54) ROBUST CORRELATION OF VEHICLE EXTENTS AND LOCATIONS WHEN GIVEN NOISY DETECTIONS AND LIMITED FIELD-OF-VIEW IMAGE FRAMES

(71) Applicant: Raytheon Company, Waltham, MA (US)

(72) Inventors: Robert F. Cromp, Clifton, VA (US); Jonathan Goldstein, Fredericksburg, VA (US)

(73) Assignee: Raytheon Company, Waltham, MA (US)

(*) Notice: Subject to any disclaimer, the term of this patent is extended or adjusted under 35 U.S.C. 154(b) by 164 days.

(21) Appl. No.: 17/180,111

(22) Filed: Feb. 19, 2021

(65) Prior Publication Data

US 2021/0326645 A1    Oct. 21, 2021

Related U.S. Application Data

(60) Provisional application No. 63/010,979, filed on Apr. 16, 2020.

(51) Int. Cl.
*G06F 17/10* (2006.01)
*G06F 18/214* (2023.01)
(Continued)

(52) U.S. Cl.
CPC ............. *G06F 18/214* (2023.01); *G06N 3/04* (2013.01); *G06T 7/20* (2013.01); *G06T 7/70* (2017.01);
(Continued)

(58) Field of Classification Search
CPC ...... G06K 9/6256; G06N 3/04; G06N 3/0445; G06N 3/084; G06N 3/0454; G06T 7/20;
(Continued)

(56) References Cited

U.S. PATENT DOCUMENTS 6,140,941 A  10/2000 Dwyer et al.
8,571,271 B2  10/2013 Yuan et al.
(Continued)

FOREIGN PATENT DOCUMENTS

AU    2019203471 B2    11/2020
WO    WO-2019241224 A1    12/2019
WO    WO-2021211861 A1    10/2021

OTHER PUBLICATIONS

"U.S. Appl. No. 16/586,480, Notice of Allowance dated Mar. 22, 2021", 12 pgs.

(Continued)

*Primary Examiner* — Qian Yang
(74) *Attorney, Agent, or Firm* — Schwegman Lundberg & Woessner, P.A.

(57) ABSTRACT

A computer accesses a plurality of image frames. The computer identifies, within the plurality of image frames, a plurality of vehicle front vehicle back detections. The computer pairs at least a subset of the plurality of vehicle back detections with vehicle front detections. A given vehicle back detection is paired with a given vehicle front detection based on camera angle relative to a predefined axis. The computer assigns, using each of a plurality of pools, a score to each vehicle front detection—vehicle back detection pair, each non-paired vehicle front detection, and each non-paired vehicle back detection. Each pool comprises a data structure representing a scoring mechanism and a set of detections. The computer assigns each detection to a pool that assigned a highest score to that detection. Upon determining that a given pool comprises at least n detections: the computer labels the given pool as representing a specific vehicle.

20 Claims, 7 Drawing Sheets

(51) Int. Cl.
| | | |
|---|---|---|
| *G06T 7/70* | (2017.01) | |
| *G06N 3/04* | (2023.01) | |
| *G06T 7/20* | (2017.01) | |
| *G06V 20/13* | (2022.01) | |

(52) U.S. Cl.
CPC .... *G06V 20/13* (2022.01); *G06T 2207/30244* (2013.01); *G06T 2207/30248* (2013.01)

(58) Field of Classification Search
CPC .............. G06T 7/70; G06T 2207/30244; G06T 2207/30248; G06T 2207/10016; G06T 2207/20081; G06T 2207/20084; G06T 7/248; G06V 20/13; G06V 10/764; G06V 10/82; G06V 20/625; G06V 2201/08; G06V 10/147; G06V 10/242; G06V 10/454; G06V 20/52; G06V 20/54; G08G 1/0116; G08G 1/0129; G08G 1/0175; G08G 1/04
See application file for complete search history.

(56) References Cited

U.S. PATENT DOCUMENTS

| | | |
|---|---|---|
| 8,600,108 B2 | 12/2013 | Tang et al. |
| 9,275,308 B2 | 3/2016 | Szegedy et al. |
| 9,418,319 B2 | 8/2016 | Shen et al. |
| 9,424,493 B2 | 8/2016 | He et al. |
| 9,514,389 B1 | 12/2016 | Erhan et al. |
| 9,542,626 B2 | 1/2017 | Martinson et al. |
| 9,691,188 B2 | 6/2017 | Breed et al. |
| 9,965,719 B2 | 5/2018 | Choi et al. |
| 10,109,052 B2 | 10/2018 | Chefd'hotel et al. |
| 10,176,405 B1 | 1/2019 | Zhou et al. |
| 10,304,193 B1 | 5/2019 | Wang et al. |
| 10,489,635 B2 | 11/2019 | Tan |
| 10,671,875 B2 | 6/2020 | Yamamoto et al. |
| 10,699,421 B1 | 6/2020 | Cherevatsky et al. |
| 11,068,747 B2 | 7/2021 | Goldstein et al. |
| 2004/0017930 A1 | 1/2004 | Kim et al. |
| 2008/0166045 A1 | 7/2008 | Xu et al. |
| 2009/0034805 A1 | 2/2009 | Perlmutter et al. |
| 2011/0013022 A1 | 1/2011 | Allen et al. |
| 2011/0160543 A1 | 6/2011 | Parsey et al. |
| 2011/0254950 A1 | 10/2011 | Bibby et al. |
| 2012/0121132 A1 | 5/2012 | Asahara et al. |
| 2012/0201464 A1 | 8/2012 | Fukui et al. |
| 2012/0301024 A1 | 11/2012 | Yuan et al. |
| 2012/0327188 A1 | 12/2012 | Takemura et al. |
| 2014/0072170 A1 | 3/2014 | Zhang et al. |
| 2015/0278601 A1 | 10/2015 | Nagamine et al. |
| 2016/0026848 A1 | 1/2016 | Hamid et al. |
| 2016/0196665 A1 | 7/2016 | Abreu et al. |
| 2016/0224833 A1 | 8/2016 | Jin |
| 2017/0147905 A1 | 5/2017 | Huang et al. |
| 2017/0169567 A1 | 6/2017 | Chefd'hotel et al. |
| 2017/0316285 A1 | 11/2017 | Ahmed et al. |
| 2018/0096595 A1 | 4/2018 | Janzen et al. |
| 2018/0211130 A1 | 7/2018 | Jiang |
| 2019/0228318 A1 | 7/2019 | Kwant et al. |
| 2019/0354857 A1 | 11/2019 | Sallee et al. |
| 2019/0370551 A1 | 12/2019 | Mao et al. |
| 2019/0392268 A1 | 12/2019 | Tariq et al. |
| 2020/0074754 A1 | 3/2020 | Kaseda et al. |
| 2020/0267373 A1 | 8/2020 | Jian |
| 2020/0412937 A1 | 12/2020 | Huang |
| 2021/0097345 A1 | 4/2021 | Goldstein et al. |
| 2022/0269899 A1 | 8/2022 | Goldstein et al. |
| 2022/0284703 A1 | 9/2022 | Lopez |

OTHER PUBLICATIONS

"International Application Serial No. PCT/US2021/027508, International Search Report dated Jul. 6, 2021", 4 pgs.

"International Application Serial No. PCT/US2021/027508, Written Opinion dated Jul. 6, 2021", 9 pgs.

Karpathy, Andrej, et al., "Large-scale Video Classification with Convolutional Neural Networks", Proceedings of the IEEE Conference on Computer Vision and Pattern Recognition, (2014), 1725-1732.

Liu, Xinchen, et al., "A Deep Learning-Based Approach to Progressive Vehicle Re-identification for Urban Surveillance", Computer Vision—ECCV, (Jan. 1, 2016).

Moun, Al-Smadi Ma, et al., "Traffic Surveillance: A Review of Vision Based Vehicle Detection, Recognition and Tracking", (Feb. 1, 2016), 2-15.

Wang, Zhongdao, et al., "Orientation Invariant Feature Embedding and Spatial Temporal Regularization for Vehicle Re-identification", IEEE International Conference on Computer Vision (ICCV), (Oct. 22, 2017), 379-387.

"Australian Application Serial No. 2019203471, First Examination Report dated Apr. 9, 2020", 6 pgs.

"Australian Application Serial No. 2019203471, Response filed Jun. 23, 2020 to First Examination Report dated Apr. 9, 2020", 67 pgs.

"Softmax Cross Entropy", Google Authors, [Online], Retrieved from the Internet: <URL: https://www.tensorflow.org/versions/r1.15/api_docs/python/tf/losses/softmax_cross_entropy> , (2019), 2 pgs.

Abadi, Martin, et al., "Tensorflow: a system for large-scale machine learning.", 12th USENIX Symposium on Operating Systems Design and Implementation., (2016), 265-283.

Angluin, D., et al., "Learning from noisy examples", Machine Learning, 2(4)., (1988), 343-370.

Beigman, E, et al., "Learning with annotation noise", In Proceedings of the Joint Conference of the 47th Annual Meeting of the ACL and the 4th International Joint Conference on Natural Language Processing of the AFNLP, vol. 1, (2009), 280-287.

Bekker, A J, et al., "Training deep neural-networks based on unreliable labels", IEEE International Conference on Acoustics, Speech and Signal Processing (ICASSP), Shanghai. (2016), 2682-2686.

Bradley, Andrew, "The Use of the Area Under the ROC Curve in the Evaluation of Machine Learning Algorithms", in the Journal of Pattern Recognition, vol. 30, No. 7, (1997), 1145-1159.

Brodley, Carla, et al., "Identifying Mislabeled Training Data", Journal of Artificial Intelligence Research 11, (1999), 131-167.

Bylander, Tom, "Learning linear threshold functions in the presence of classification noise", Proceedings of the seventh annual conference on Computational learning theory, (1994), 340-347.

Clark, Alex, "Pillow (PIL Fork) Documentation, Release 6.2.1", (2019), 203 pgs.

Deng, J., et al., "ImageNet: A Large-Scale Hierarchical Image Database", IEEE Computer Vision and Pattern Recognition, (2009), 248-255.

Dutt Jain, S, "Predicting sufficient annotation strength for interactive foreground segmentation", Proceedings of the IEEE International Conference on Computer Vision, (2013), 1313-1320.

Grandvalet, Yves, et al., "Entropy Regularization", Semi-supervised learning, MIT Press, (2006), 151-168.

Hunter, John, "Matplotfib: A 2D graphics environment", Computing in science & engineering, 9(3), (2007), 90-95.

Iandola, F. N., "Squeezenet: Alexnet-level accuracy with 50x fewer parameters and < 0.5 mb model size", arXiv:1602.07360v4 [cs.CV] Nov. 4, 2016, (2016), 13 pgs.

Israel, Steven, et al., "ECG to identify individuals", Pattern Recognition 38(1), (2005), 133-142.

Israel, Steven, et al., "Fusing face and ECG for personal identification", Applied Imagery Pattern Recognition Workshop Proceedings,32nd, (2003), 226-231.

Israel, Steven, "Performance metrics: how and when", Geocarto International, vol. 21, No. 2, (2006), 23-32.

Jindal, I, "Learning deep networks from noisy labels with dropout regularization", Data Mining (ICDM) (2016), 967-972.

Krizhevsky, A., et al., "ImageNet classification with deep convolutional neural networks", Advances in Neural Information Processing Systems, 25(2), (2012), 1097-1105.

(56) References Cited

OTHER PUBLICATIONS

Krizhevsky, Alex, "Learning Multiple Layers of Features from Tiny Images", In Technical Report of University of Toronto, (Apr. 8, 2009), 1-60.
Larsen, Jan, et al., "Design of Robust Neural Network Classifiers", Proceedings of the 1998 IEEE International Conference on, vol. 2, (1998), 1205-1208.
Lawrence, N D, "Estimating a kernel fisher discriminant in the presence of label noise", ICML, vol. 1, (2001), 306-313.
Lecun, Y, et al., "The MNIST Database of handwritten digits", [Online]. Retrieved from the Internet: <URL: http://yann.lecun.com/exdb/mnist/>, (Accessed Nov. 18, 2019), 7 pgs.
Lee, Dong-Hyun, "Pseudo-label: The simple and efficient semi-supervised learning method for deep neural networks", Workshop on Challenges in Representation Learning, ICML. vol. 3, (2013), 6 pgs.
Li, Yuncheng, et al., "Learning from Noisy Labels with Distillation", IEEE International Conference on Computer Vision, (2017), 9 pgs.
Liu, Wei, et al., "SSD: Single Shot MultiBox Detector", CVPR, arXiv:1512.02325v5 [cs.CV] Dec. 29, 2016, (2016), 17 pgs.
Markidis, S, "INVIDIA Tensor Core Programmability, Performance & Precision", arXiv:1803.04014v1, (2018), 12 pgs.
Metzen, J H, et al., "On detecting adversarial perturbations", International Conference on Learning Representations, (2017), 12 pgs.
Metzen, J H, et al., "Universal adversarial perturbations against semantic image segmentation", arXiv:1704.05712v3, (2017), 17 pgs.
Mnih, V, et al., "Learning to Label Aerial images from Noisy Data", Proceedings of the 29th International Conference on Machine Learning (ICML-12), (2012), 567-574.
Moosavi-Dezfooli, Seyed-Mohsen, et al., "Universal adversarial perturbations", Computer Vision and Pattern Recognition. IEEE. arXiv:1610.08401v3 [cs.CV], (2017), 11 pgs.
Mullen, James, et al., "Comparing the Effects of Annotation Type on Machine Learning Detection Performance", IEEE Conference on Computer Vision and Pattern Recognition Workshops, (2019), 7 pgs.
Natarajan, N, et al., "Learning with Noisy Labels", Advances in neural information processing systems, (2013), 1196-1204.
Nigam, Kamal, et al., "Analyzing the Effectiveness and Applicability of Co-training", Proceeding of the Ninth International Conference on information and Knowledge Management, (Nov. 2000), 8 pgs.
Papernot, Nicolas, et al., "Distillation as a Defense to Adversarial Perturbations Against Deep Neural Networks", 37th IEEE Symposium on Security & Privacy, (2016), 582-597.
Reed, S. E., et al., "Training Deep Neural Networks on Noisy Labels with Bootstrapping", arXiv:1412.6596v [cs.CV], (2014), 1-11.
Rolnick, David, et al., "Deep learning is robust to massive label noise", arXiv:1705.10694v1, (2017), 10 pgs.
Rosenberg, C, et al., "Semi-supervised self-training of object detection models.", Proceedings of the Seventh IEEE Workshop on Applications of Computer Vision, vol. 1, (2005), 8 pgs.
Ruder, S, "An overview of gradient descent optimization algorithms", arXiv preprint arXiv:1609.04747., (2017), 14 pgs.
Sermanet, Pierre, et al., "Overfeat: Integrated recognition, localization and detection using convolutional networks", arXiv preprint arXiv, (2013), 16 pgs.
Simard, et al., "Best Practices for Convolutional Neural Networks applied to Visual Document Analysis", In Proceedings of the Seventh International Conference on Document Analysis and Recognition, vol. 2, (2003), 6 pgs.
Simonyan, Karen, et al., "Very Deep Convolutional Networks for Large-Scale Image Recognition.", ICLR 2015, arXiv:1409.1556, (Apr. 10, 2015), 14 pgs.
Srivastava, N., et al., "Dropout a Simple Way to Prevent Neural Networks from Overfitting", In Journal of Machine Learning Research, 15(1), (Jan. 2014), 1929-1958.
Sukhbaatar, S., et al., "Learning from noisy labels with deep neural networks.", arXiv preprint arXiv:1406.2080, (2014), 1-10.
Tanner, Franklin, et al., "Overhead Imagery Research Data Set—An annotated data library and tools to aid in the development of computer vision algorithms", IEEE Applied Imagery Pattern Recognition Workshop, (2009), 1-8.
Woods, Kevin, et al., "Generating ROC curves for artificial neural networks", EEE Transactions on Medical Imaging, vol. 16, No. 3, (Jun. 1997), 329-337.
Xiao, Tong, et al., "Learning from Massive Noisy Labeled Data for Image Classification", In CVPR, (2015), 2691-2699.
Zhao, Zhong-Qiu, "Object Detection with Deep Learning: A Review", IEEE Transactions on Neural Networks and Learning Systems. arXiv:1807.05511v2 [cs.CV], (2019), 21 pgs.
Zhu. X, et al., "Class noise vs. attribute noise: A quantitative study", Artificial Intelligence Review, 22, (2004), 177-210.
U.S. Appl. No. 16/586,480, filed Sep. 27, 2019, Computer Architecture for Object Detection Using Point-Wise Labels.
U.S. Appl. No. 17/181,581, filed Feb. 22, 2021, Image-Based Vehicle Classification.
"U.S. Appl. No. 17/181,581, Corrected Notice of Allowability dated Dec. 23, 2022", 2 pgs.
"U.S. Appl. No. 17/181,581, Notice of Allowance dated Sep. 30, 2022", 8 pgs.
"International Application Serial No. PCT/US2021/027508, International Preliminary Report on Patentability dated Oct. 27, 2022", 11 pgs.

ROBUST CORRELATION OF VEHICLE EXTENTS AND LOCATIONS WHEN GIVEN NOISY DETECTIONS AND LIMITED FIELD-OF-VIEW IMAGE FRAMES

PRIORITY CLAIM

This application claims priority to U.S. Provisional Patent Application No. 63/010,979, filed on Apr. 16, 2020, entitled "ROBUST CORRELATION OF VEHICLE EXTENTS AND LOCATIONS WHEN GIVEN NOISY DETECTIONS AND LIMITED FIELD-OF-VIEW IMAGE FRAMES," the entire content of which is incorporated herein by reference.

RELATED APPLICATION

This application relates to U.S. patent application Ser. No. 16/586,480, filed on Sep. 27, 2019, entitled "COMPUTER ARCHITECTURE FOR OBJECT DETECTION USING POINT-WISE LABELS," the entire content of which is incorporated herein by reference.

TECHNICAL FIELD

Embodiments pertain to computer architecture. Some embodiments relate to neural networks. Some embodiments relate to a robust correlation of vehicle extents and locations when given noisy detections and limited field-of-view image frames.

BACKGROUND

Detecting a vehicle in a camera feed may be useful, for example, in automated tolling on a toll road. However, such detecting may be challenging. Techniques and approaches for vehicle detection may be desirable.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
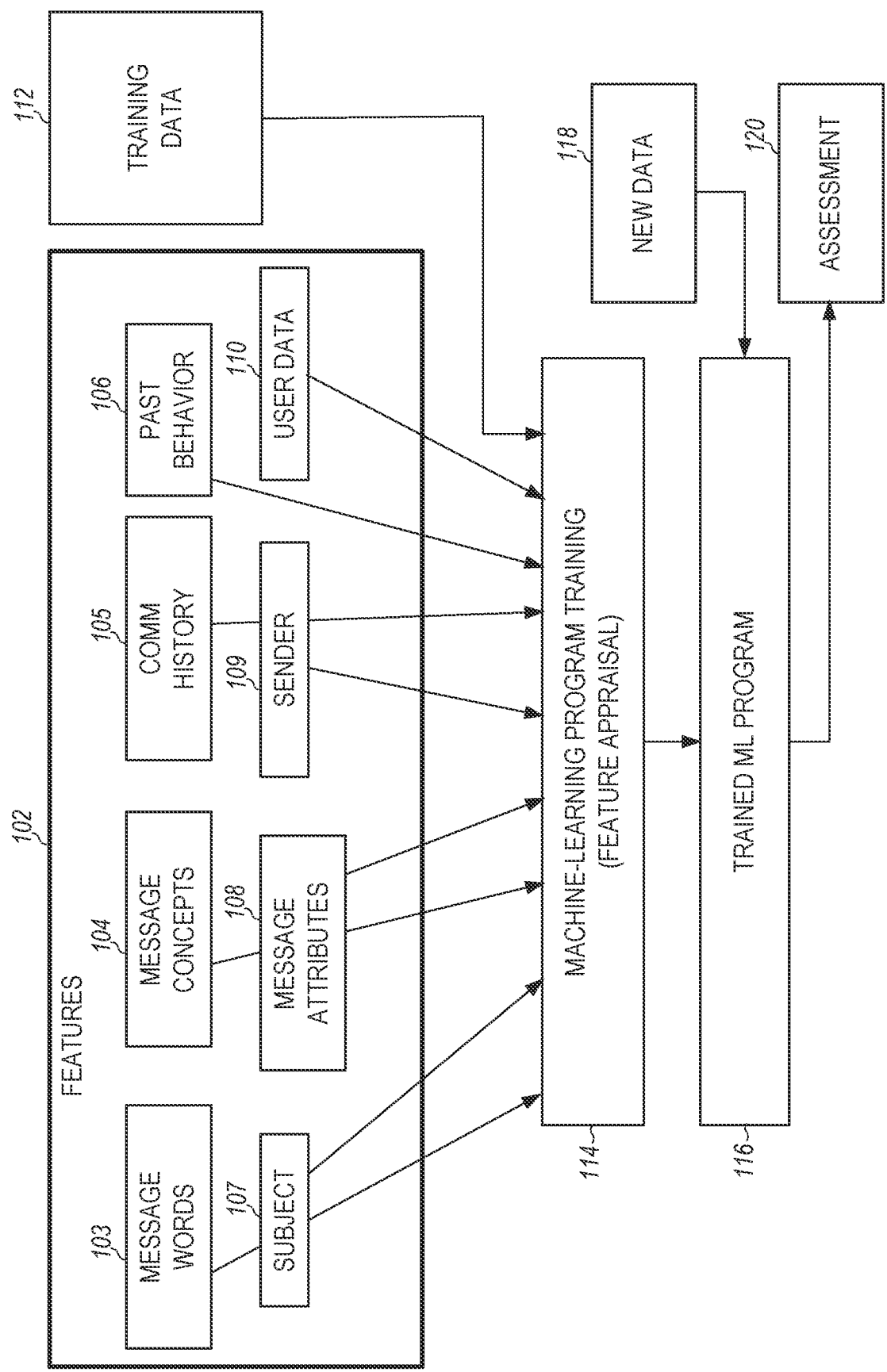
FIG. 1 illustrates the training and use of a machine-learning program, in accordance with some embodiments.

FIG. 1 illustrates the training and use of a machine-learning program, according to some example embodiments.

In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
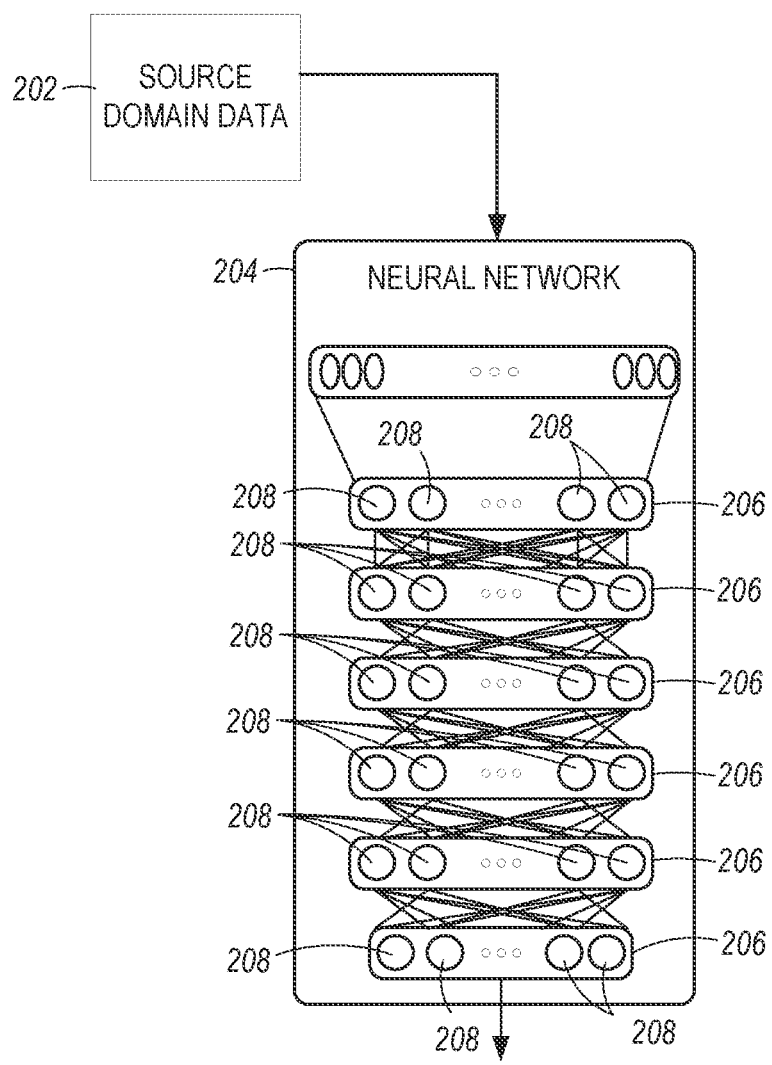
FIG. 2 illustrates an example neural network, in accordance with some embodiments.
Figure 2:
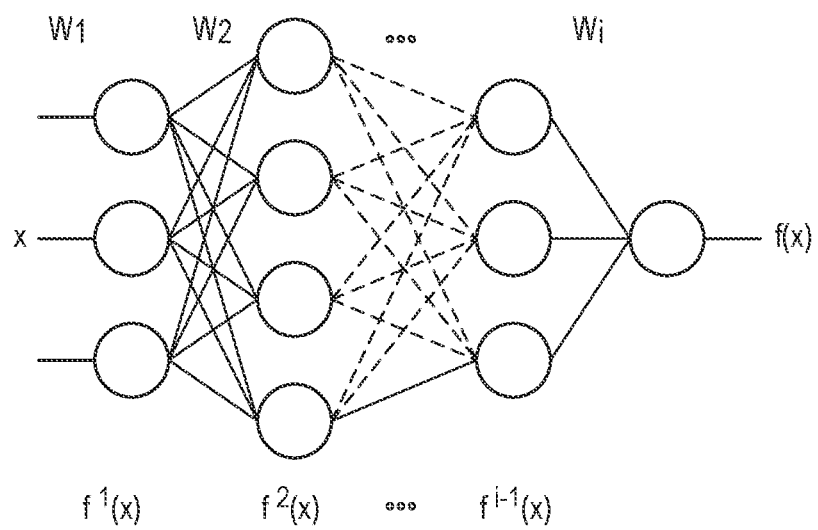

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive at $f^1(x), f^2(x), \ldots, f^{i-1}(x)$ until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM node serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
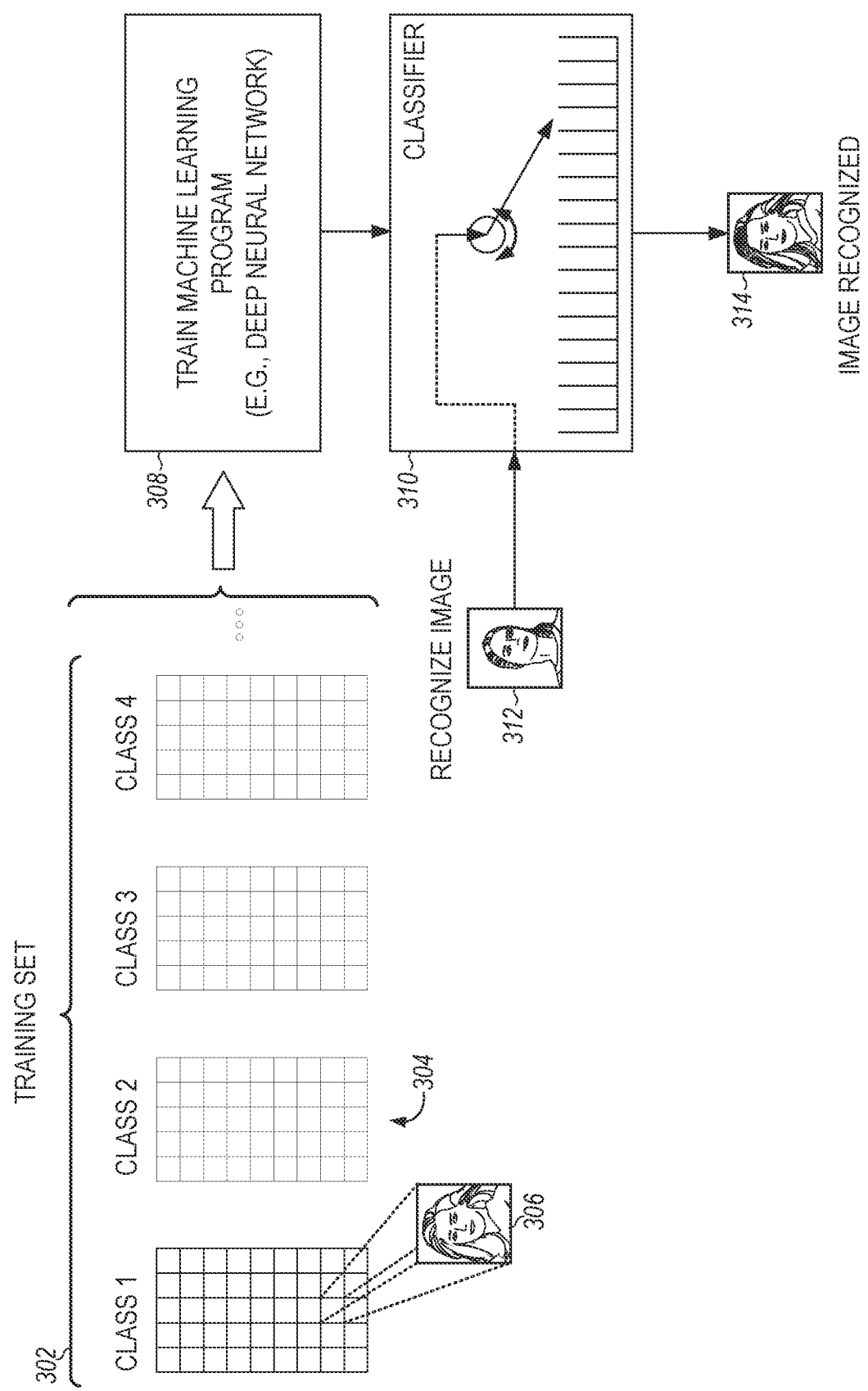
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, one class corresponds to Bill Clinton, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
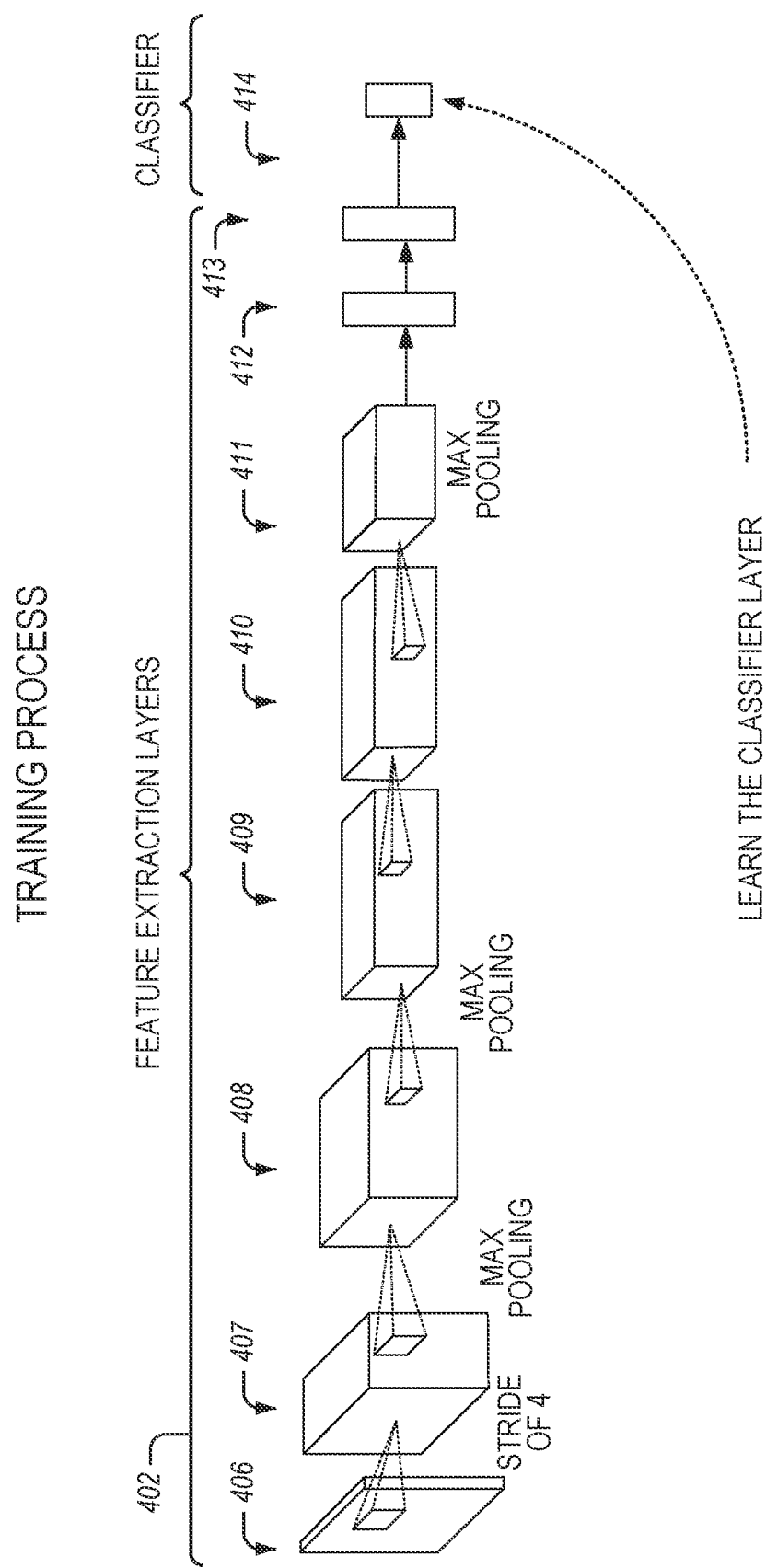
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

Figure 5:
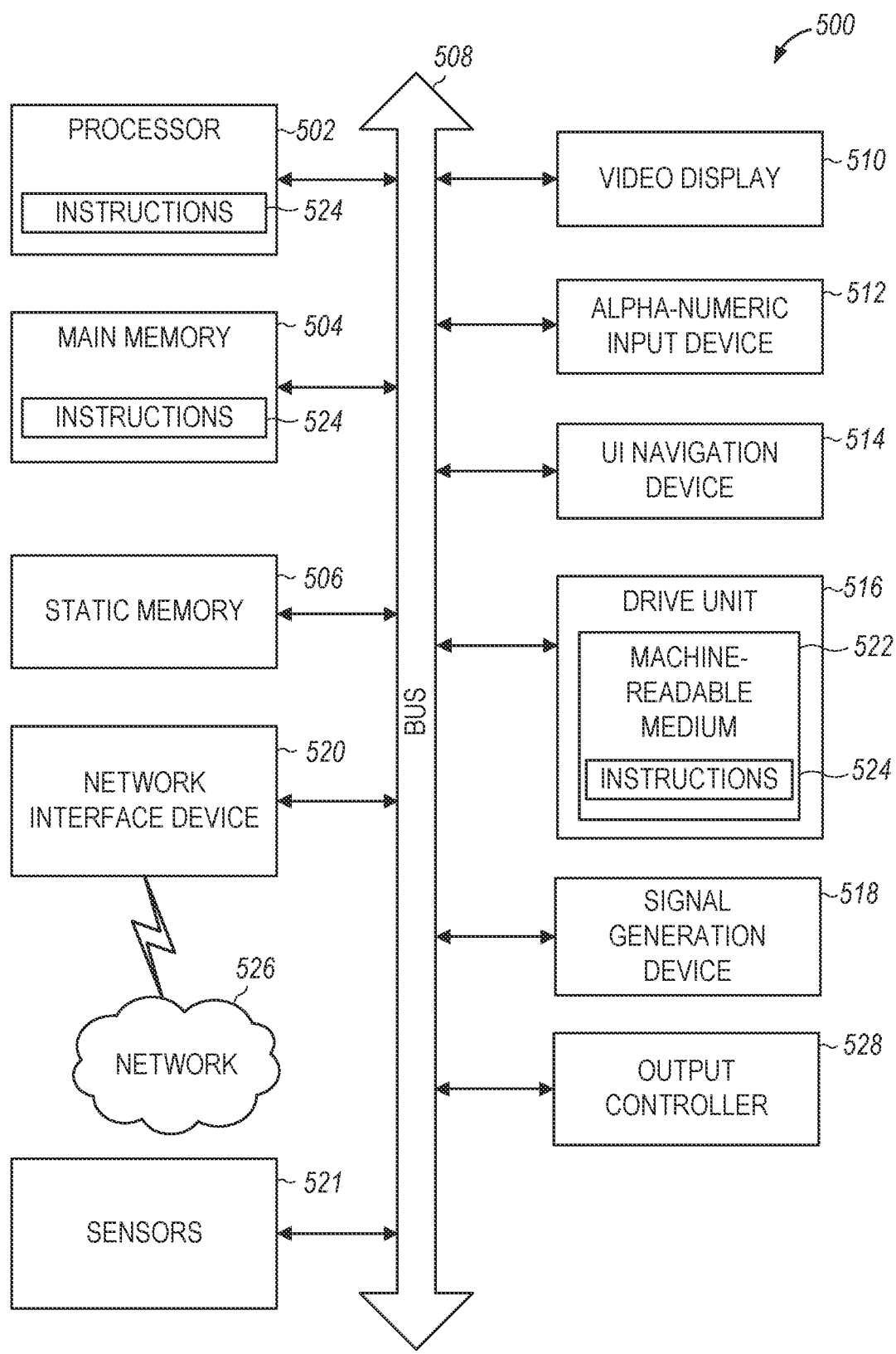
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application)) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

This document may reference a specific number of things (e.g., "six detections"). Unless explicitly set forth otherwise, the numbers provided are examples only and may be replaced with any positive integer, integer or real number, as would make sense for a given situation. For example "six detections" may, in alternative embodiments, include any positive integer number of detections. Unless other wise mentioned, an object referred to in singular form (e.g., "a computer" or "the computer") may include one or multiple objects (e.g., "the computer" may refer to one or multiple computers).

Some embodiments relate to a more cost-efficient system for highway tolling builds off full motion video (FMV) of an overhead highway view. Some concerns include the determination of (1) when and where a vehicle enters the frame, (2) the track for each vehicle across the field of view, and (3) when and where a vehicle exits the frame. Machine learning trained convolutional neural networks (CNNs) offer one solution to image and video based object detection. However, the dominant paradigm for CNNs is to apply bounding boxes, which might, in some cases, fail to successfully track vehicles. Specifically, bounding boxes are sensitive to perspective changes and convey content-in-frame. Sensitivity to perspective and border proximity may be undesirable for the purpose of tracking.

Modern tollbooth operations might, in some cases, support "pop-up" tolling stations that use a fixed video camera to capture image frames of traffic as it transits the camera's view field. Oftentimes, the camera's field of view might be limited, resulting in the inability to capture the entire vehicle within any given frame of the video. Toll charges might be based on the vehicle type, which is a function of the size of the vehicle. One approach uses a video camera to capture view frames, and then passes this data through a graphic processing unit (GPU) based neural network detector that produces a set of independent detections. Each detection attempts to pinpoint the location of the front or back license plate of any vehicle in a given frame. These detections, while often correct, might be at times noisy, spurious, missing or inconsistent as the vehicles move through the field of view. According to some embodiments, a tracker uses these detections to ascertain which front detections belong with which back detections, thereby defining the extent and path of vehicles. Given limited and noisy data, this tracker might match up back detections to a vehicle whose front detections occur in totally different view frames.

Some traffic monitoring and classification systems, for example, in roadway based system, while proving a high vehicle classification accuracy, might have high overall associated cost and disruptive installations. Side roadway based systems have reduced associated costs relative to in roadway systems, but they might, in some cases, fail to classify overlapping vehicles. Over roadway based systems have reasonably high vehicle classification accuracy but are affected by weather and lighting conditions.

Some embodiments related to image or video-based recognition systems for intelligent transportation systems. Some embodiments classify vehicles into one of the thirteen classes in the Federal Highway Administration (FHWA) vehicle classification scheme of the United States. Some embodiments relate to detection, tracking and classification of vehicles.

Figure 6:
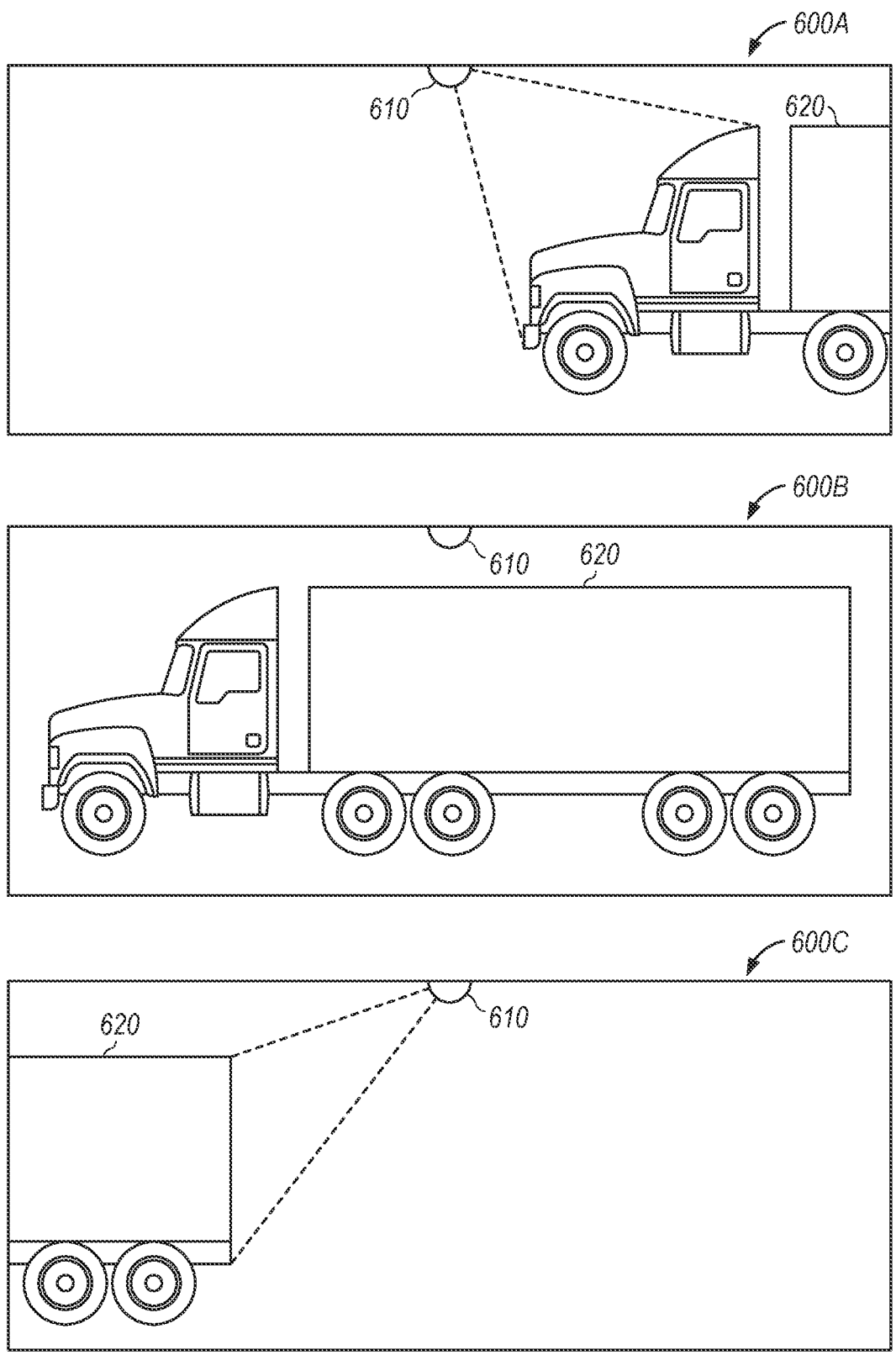
FIG. 6 illustrates a camera viewing a moving vehicle, in accordance with some embodiments.

FIG. 6 illustrates a camera 610 viewing a moving vehicle 620 as the moving vehicle moves from position 600A to position 600B to position 600C, in accordance with some embodiments. At position 600A, the camera 610 detects the front of the vehicle 620. At position 600B, the camera 610 detects neither the front nor the back of the vehicle 620, and interpolation may be used to determine the position of the front and/or the back of the vehicle. At position 600C, the camera 610 detects the back of the vehicle 620. The camera 610 may be coupled with one or more computing machines (e.g., computing machine 500) to implement the method described in conjunction with FIG. 7.

In connection with the detection of vehicles, for the purpose of generating labeled images to train a CNN: (i) given an overhead video of a highway in which front and back anchors are sometimes visible and sometimes obscured, human generated annotations are collected; (ii) an automated interpolator extends the human annotations to frames in which the anchors are obscured; (iii) fitting to fixed indicators on the highway, the camera coordinate system is converted to an orthorectified system using an affine transform; and (iv) in the converted coordinate system, the interpolator matches front-back pair according to the constraints: (a) the distance between the front and back is constant over time; (b) the position of the front/back pairs fits a second order polynomial in time; (c) the angle of the front-back pair fits a first order polynomial in time and (d) the angle between the instantaneous direction of motion and the line connecting front to back is minimal (i.e., below a predefined threshold). In training and at inference, the CNN is presented with one or more frames that precede the current frame as separate channels.

Some embodiments relate to annotating fixed parts (front, back) of vehicles when visible to a camera. Some embodiments relate to pairing and extending the annotations to frames in which the annotations are not present and with a physically constrained matching algorithm. Some embodiments relate to detecting visible wheels and carrier/trailer breaks to determine vehicle class. In some embodiments, an artificial neural network (e.g., CNN) is presented with multiple frames as input channels.

To train the CNN, crowd-sourced annotations may be used where they are reliable. Data may be converted to an orthonormal coordinate system. Frame annotations may be paired and extended to frames in which indicators are not visible with interpolation. The distance between the front and the back of a vehicle may be constrained to be constant. The linear motion of the front/rear pair may be constrained to a second order polynomial with time. The angle between lines connecting the front and the back of the vehicle and the direction of motion may be constrained. Extended labels among the N previous frames (where N is a positive integer) may be provided to the CNN.

Some aspects of vehicle detection and tracking may include one or more of the following numbered features.

Feature 1: Given a set of independently determined front and back detections from a variety of vehicles imaged moving through a camera's field of view, the computer creates pools of related detections, where a related detection is a front or back detection for the same vehicle drawn from any of the frames in which any portion of that vehicle is visible.

Feature 2: The computer determines that a back detection belongs to a pool even though the front detection for that vehicle may have occurred many frames earlier.

Feature 3: The computer determines that a back detection belongs to a pool even if the front detection of the vehicle left the camera field of view many frames earlier.

Feature 4: Using a pool that contains front and back detections, the computer determines where the front of the vehicle and the back of the vehicle are located at any time, assuming the vehicle is moving a constant speed.

Feature 5: The computer determines the frame number and row in which the vehicle entered the frame, and the frame number and row that the vehicle exited the frame, provided it is given some valid front and back detections from any time the vehicle is in camera view.

In order to develop a framework to classify vehicle types, some aspects use a downward looking camera. For each vehicle, some aspects measure: (i) length, (ii) number and position of axles, (iii) is the cab affixed to the trailer or is there a reticulation point, and (iv) number and position of trailers. For each camera frame, some embodiments receive detections from a CNN, where a detection can be the front or back of any vehicle in the frame. Over a series of frames, some embodiments create a pool that includes all the fronts and backs that belong to a specific vehicle as it moves throughout the camera field of view. Spurious detections are ignored or placed in pools that do not get enough reinforcement in successive frames to reach the level of being labeled as vehicles. Pools with sufficient support are labeled as vehicles.

As used herein, the term "pool" includes its plain and ordinary meaning. Among other things, a pool may include a collection of detections.

Figure 7:
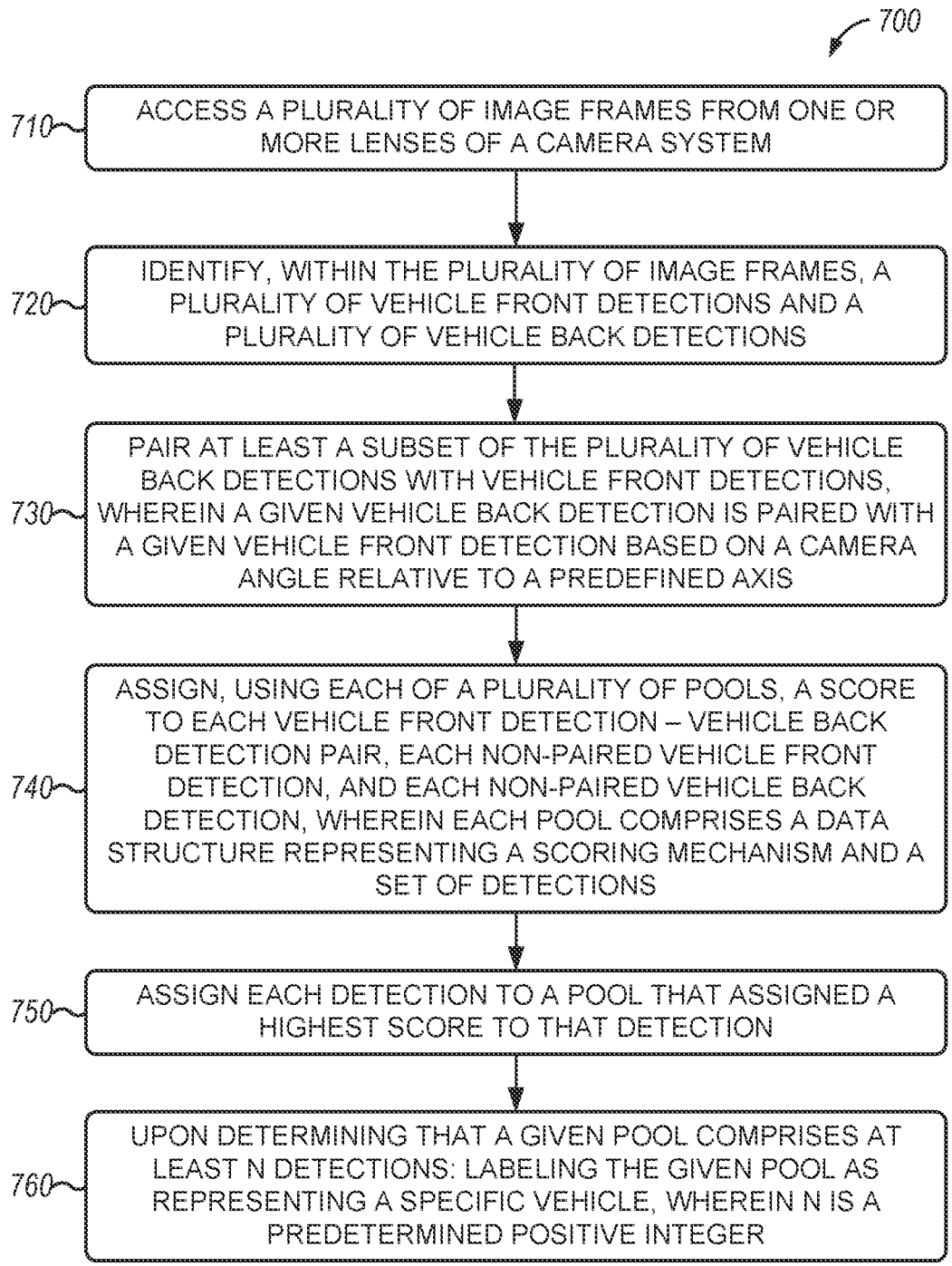
FIG. 7 is a flow chart illustrating a method for assigning image(s) to a pool, in accordance with some embodiments.

FIG. 7 is a flow chart illustrating a method 700 for assigning image(s) to a pool, in accordance with some embodiments. The method 700 may be implemented at a computing machine (e.g., one or more of the computing machines 500).

At operation 710, the computing machine accesses a plurality of image frames from one or more lenses of a camera system.

At operation 720, the computing machine identifies, within the plurality of image frames, a plurality of vehicle front detections and a plurality of vehicle back detections.

At operation 730, the computing machine pairs at least a subset of the plurality of vehicle back detections with vehicle front detections. A given vehicle back detection is paired with a given vehicle front detection based on a camera angle relative to a predefined axis.

At operation 740, the computing machine assigns, using each of a plurality of pools, a score to each vehicle front detection—vehicle back detection pair, each non-paired vehicle front detection, and each non-paired vehicle back detection. Each pool comprises a data structure representing a scoring mechanism and a set of detections. In some embodiments, the scoring mechanism is based on a speed of a vehicle, and an angle between a line associated with a given image frame and a line between at least one of the vehicle back detections and at least one of the vehicle front detections.

At operation 750, the computing machine assigns each detection to a pool that assigned a highest score to that detection.

At operation 760, upon determining that a given pool comprises at least n detections, the computing machine labels the given pool as representing a specific vehicle, where n is a predetermined positive integer. In some embodiments, n is equal to 6. However, n may be any other predetermined positive integer.

In some embodiments, the computing machine determines that the given pool includes multiple vehicle front detections. In some embodiments, the computing machine determines that the given pool includes multiple vehicle back detections. The computing machine may verify that the multiple vehicle front detections and/or the multiple vehicle back detections are associated with the specific vehicle. In some embodiments, the computing machine may verify that a direction of travel of the vehicle is from at least one of the vehicle back detections to at least one of the vehicle front detections.

In some embodiments, the score is assigned using a scoring function for assessing fit of a given detection to a given pool. The scoring function may be based on an alignment between a camera orientation and a direction of travel. The scoring function may comprise one or more polynomials representing a vehicle front detection position within a given image frame or a vehicle back detection position within the given image frame. Each position may include a row and a column (e.g., x and y-coordinates in an image). In some cases, there may be four polynomials: (i) vehicle front row as a function of time, (ii) vehicle front column as a function of time, (iii) vehicle back row as a function of time, and (iv) vehicle back column as a function of time.

The scoring function for the given pool may be based on at least a predetermined number of assigned detections to the given pool. The scoring function may incorporate an assessment on an orientation of a vehicle for vehicle front detection—vehicle back detection pair. The scoring function may incorporate a weighting. The weighting may be based on vehicle orientation, speed, and movement from left to right in the field of view. The scoring function may score the given detection relative to other detections in the given pool. The scoring function may be based on a total number of other detections in the given pool.

A pool may include a collection of detections. For each image frame, the computing machine may pair each back detection with a front detection, provided: (i) the front detection is to the right of the back detection, (ii) the angle to the x-axis from back to front detection is no greater than 20 (or another predefined number of) degrees, and (iii) this is the closest front detection to the back detection meeting the above criteria.

For each active pool, the computing machine scores the detection. Score>0 means potential compatibility with the detections already recorded with this active pool. Score=−1 means the detection does not fit with this pool. The computing machine scores each paired detection. The computing machine score each non-paired front detection. The computing machine scores each non-paired back detection. The computing machine adds the paired or non-paired detection to the active pool that scored it highest. If more than one detection scored positively for an active pool, the computing machine only adds the highest scoring detection to that pool.

If a detection is not added to any off the active pools, then the computing machine creates a new pool with the detection (paired or unpaired). The computing machine removes stale pools from the active pools (configurable, currently any pool created more than a preset number of (e.g., 40) frames ago—based on how long a large truck (or other vehicle) transits the view). If a pool receives at least n detections (front and/or back), the computing machine labels the pool as a vehicle.

According to some scoring approaches, if the pool only has one front detection, then the received front detection may be within a threshold number of rows, and further to the right. If the pool has multiple front detections, estimate what row/column the front detection for this frame may be, and check they are within set thresholds of this. (The computing machine may use a first order polynomial to predict row, and another to predict column.) Similar techniques may be used for back detections. Vehicles may be assumed to travel below a predefined speed, for example 200 kilometers per hour or 120 miles per hour. Weights may be apportioned across these factors to compute a score from 0 to 1, or the computing machine may return −1 if any constraints are violated. (If the scoring is against a pool with one detection, the score may be limited to 0.5.)

One embodiment may be built within python and use standard python libraries (e.g., numpy and cv2). It has no external dependencies. Many variations are possible.

Given a set of independently determined front and back detections from a variety of vehicles imaged moving through a camera's field of view, some embodiments create pools of related detections, where a related detection is a front or back detection for the same vehicle drawn from any of the frames in which any portion of that vehicle is visible. Some embodiments determine that a back detection belongs to a pool even though the front detection for that vehicle may have occurred many frames earlier. Some embodiments determine that a back detection belongs to a pool even if the front detection of the vehicle left the camera field of view many (e.g., 100, 1000) frames earlier. Using a pool that contains front and back detections, some embodiments determine where the front of the vehicle and the back of the vehicle are located at any time, assuming the vehicle is moving a constant speed. Some embodiments determine the frame number and row in which the vehicle entered the frame, and the frame number and row that the vehicle exited the frame, provided it is given some valid front and back detections from any time the vehicle is in camera view.

Some embodiments have a python implementation of the tracker. Some embodiments are tested with additional data sets under a variety of lighting and weather conditions. Some embodiments may relate to: (i) a system to annotate overhead imagery collected from fixed gantry for vehicle tracking applications, (ii) roadside transactional management system, and (iii) a multi-sensor coordinator for camera. Some embodiments may include: (i) a feedback loop between the tracker and the detector so the detector can be informed of spurious/false detections, (ii) the ability to detect when a vehicle is slowing down or stopped, (iii) the ability to determine other features belong to the same vehicle, including axles and reticulation points or (iv) the ability to classify vehicles based on the FHWA's schema.

Some embodiments are described as numbered examples (Example 1, 2, 3, etc.). These are provided as examples only and do not limit the technology disclosed herein.

Example 1 is a method comprising: accessing a plurality of image frames from one or more lenses of a camera system; identifying, within the plurality of image frames, a plurality of vehicle back detections; pairing at least a subset of the plurality of vehicle back detections with vehicle front detections, wherein a given vehicle back detection is paired with a given vehicle front detection based on a camera angle relative to a predefined axis; assigning, using each of a plurality of pools, a score to each vehicle front detection—vehicle back detection pair, each non-paired vehicle front detection, and each non-paired vehicle back detection, wherein each pool comprises a data structure representing a scoring mechanism and a set of detections; assigning each detection to a pool that assigned a highest score to that detection; and upon determining that a given pool comprises at least n detections: labeling the given pool as representing a specific vehicle, wherein n is a predetermined positive integer.

In Example 2, the subject matter of Example 1 includes, determining that the given pool comprises multiple vehicle front detections; and verifying that the multiple front detections are associated with the specific vehicle.

In Example 3, the subject matter of Examples 1-2 includes, determining that the given pool comprises multiple vehicle back detections; and verifying that the multiple back detections are associated with the specific vehicle.

In Example 4, the subject matter of Examples 1-3 includes, determining that the given pool comprises multiple vehicle front detections; determining that the given pool comprises multiple vehicle back detections; and verifying that the multiple front detections and the multiple back detections are associated with the specific vehicle.

In Example 5, the subject matter of Example 4 includes, verifying that a direction of travel of the vehicle is from at least one of the vehicle back detections to at least one of the vehicle front detections.

In Example 6, the subject matter of Examples 1-5 includes, wherein the scoring mechanism is based on a speed of a vehicle, and an angle between a line associated with a given image frame and a line between at least one of the vehicle back detections and at least one of the vehicle front detections.

In Example 7, the subject matter of Examples 1-6 includes, wherein n is equal to six.

In Example 8, the subject matter of Examples 1-7 includes, wherein the score is assigned using a scoring function for assessing fit of a given detection to a given pool, wherein the scoring function is based on an alignment between a camera orientation and a direction of travel, wherein the scoring function comprises one or more polynomials representing a vehicle front detection position within a given image frame or a vehicle back detection position within the given image frame, wherein each position comprises a row and a column.

In Example 9, the subject matter of Example 8 includes, wherein the scoring function for the given pool is based on at least a predetermined number of assigned detections to the given pool.

In Example 10, the subject matter of Examples 8-9 includes, wherein the scoring function incorporates an assessment on an orientation of a vehicle for vehicle front detection—vehicle back detection pair.

In Example 11, the subject matter of Examples 8-10 includes, wherein the scoring function incorporates a weighting, the weighting being based on vehicle orientation, speed, and movement from left to right in the field of view.

In Example 12, the subject matter of Examples 8-11 includes, wherein the scoring function scores the given detection relative to other detections in the given pool, wherein the scoring function is based on a total number of other detections in the given pool.

Example 13 is at least one machine-readable medium including instructions that, when executed by processing circuitry, cause the processing circuitry to perform operations to implement of any of Examples 1-12.

Example 14 is an apparatus comprising means to implement of any of Examples 1-12.

Example 15 is a system to implement of any of Examples 1-12.

Example 16 is a method to implement of any of Examples 1-12.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. A method comprising:
accessing a plurality of image frames from one or more lenses of a camera system;

identifying, within the plurality of image frames, a plurality of vehicle front and a plurality of vehicle back detections;

pairing at least a subset of the plurality of vehicle back detections with vehicle front detections, wherein a given vehicle back detection is paired with a given vehicle front detection based on a camera angle relative to a predefined axis;

assigning, using each of a plurality of pools, a score to each vehicle front detection—vehicle back detection pair, each non-paired vehicle front detection, and each non-paired vehicle back detection, wherein each pool comprises a data structure representing a scoring mechanism and a set of detections, wherein the score is assigned using a scoring function that is based on an alignment between a camera orientation and a direction of travel;

assigning each detection to a pool that assigned a highest score to that detection; and upon determining that a given pool comprises at least n detections: labeling the given pool as representing a specific vehicle, wherein n is a predetermined positive integer.

2. The method of claim 1, further comprising:
determining that the given pool comprises multiple vehicle front detections; and
verifying that the multiple front detections are associated with the specific vehicle.

3. The method of claim 1, further comprising:
determining that the given pool comprises multiple vehicle back detections; and
verifying that the multiple back detections are associated with the specific vehicle.

4. The method of claim 1, further comprising:
determining that the given pool comprises multiple vehicle front detections;
determining that the given pool comprises multiple vehicle back detections; and
verifying that the multiple front detections and the multiple back detections are associated with the specific vehicle.

5. The method of claim 4, further comprising:
verifying that a direction of travel of the vehicle is from at least one of the vehicle back detections to at least one of the vehicle front detections.

6. The method of claim 1, wherein the scoring mechanism is based on a speed of a vehicle, and an angle between a line associated with a given image frame and a line between at least one of the vehicle back detections and at least one of the vehicle front detections.

7. The method of claim 1, wherein is equal to 6.

8. The method of claim 1, wherein the score is assigned using a scoring function for assessing fit of a given detection to a given pool, wherein the scoring function comprises one or more polynomials representing a vehicle front detection position within a given image frame or a vehicle back detection position within the given image frame, wherein each position comprises a row and a column.

9. The method of claim 8, wherein the scoring function for the given pool is based on at least a predetermined number of assigned detections to the given pool.

10. The method of claim 8, wherein the scoring function incorporates an assessment on an orientation of a vehicle for vehicle front detection—vehicle back detection pair.

11. The method of claim 8, wherein the scoring function incorporates a weighting, the weighting being based on vehicle orientation, speed, and movement from left to right in a field of view.

12. The method of claim 8, wherein the scoring function scores the given detection relative to other detections in the given pool, wherein the scoring function is based on a total number of other detections in the given pool.

13. A system comprising:
processing circuitry and memory, the processing circuitry to:
access a plurality of image frames from one or more lenses of a camera system;
identify, within the plurality of image frames, a plurality of vehicle front and a plurality of vehicle back detections;
pair at least a subset of the plurality of vehicle back detections with vehicle front detections, wherein a given vehicle back detection is paired with a given vehicle front detection based on a camera angle relative to a predefined axis;
assign; using each of a plurality of pools, a score to each vehicle front detection—vehicle back detection pair, each non-paired vehicle front detection, and each non-paired vehicle back detection, wherein each pool comprises a data structure representing a scoring mechanism and a set of detections, wherein the score is assigned using a scoring function that is based on an alignment between a camera orientation and a direction of travel;
assign each detection to a pool that assigned a highest score to that detection; and
upon determining that a given pool comprises at least n detections: label the given pool as representing a specific vehicle; wherein n is a predetermined positive integer.

14. The system of claim 13, the processing circuitry further to:
determine that the given pool comprises multiple vehicle front detections; and
verify that the multiple front detections are associated with the specific vehicle.

15. The system of claim 13, the processing circuitry further to:
determine that the given pool comprises multiple vehicle back detections; and
verify that the multiple back detections are associated with the specific vehicle.

16. The system of claim 13, the processing circuitry further to:
determine that the given pool comprises multiple vehicle front detections;
determine that the given pool comprises multiple vehicle back detections; and
verify that the multiple front detections and the multiple back detections are associated with the specific vehicle.

17. The system of claim 16, the processing circuitry further to:
verify that a direction of travel of the vehicle is from at least one of the vehicle back detections to at least one of the vehicle front detections.

18. A machine-readable medium storing instructions which, when executed by processing circuitry of one or more machines, cause the processing circuitry to:
access a plurality of image frames from one or more lenses of a camera system;

identify, within the plurality of image frames, a plurality of vehicle front and a plurality of vehicle back detections;
pair at least a subset of the plurality of vehicle back detections with vehicle front detections, wherein a given vehicle back detection is paired with a given vehicle front detection based on a camera angle relative to a predefined axis;
assign, using each of a plurality of pools, a score to each vehicle front detection—vehicle back detection pair, each non-paired vehicle front detection, and each non-paired vehicle back detection, wherein each pool comprises a data structure representing a scoring mechanism and a set of detections, wherein the score is assigned using a scoring function that is based on an alignment between a camera orientation and a direction of travel;
assign each detection to a pool that assigned a highest score to that detection; and
upon determining that a given pool comprises at least n detections: label the given pool as representing a specific vehicle, wherein n is a predetermined positive integer.

19. The machine-readable medium of claim 18, further storing instructions which, when executed by the processing circuitry, cause the processing circuitry to:
determine that the given pool comprises multiple vehicle front detections; and
verify that the multiple front detections are associated with the specific vehicle.

20. The machine-readable medium of claim 18, further storing instructions which, when executed by the processing circuitry, cause the processing circuitry to:
determine that the given pool comprises multiple vehicle back detections and verify that the multiple back detections are associated with the specific vehicle.

* * * * *